(12) United States Patent
Pine et al.

(10) Patent No.: US 9,486,768 B2
(45) Date of Patent: Nov. 8, 2016

(54) COLLOIDS WITH VALENCE: FABRICATION, FUNCTIONALIZATION AND DIRECTIONAL BONDING

(71) Applicant: New York University, New York, NY (US)

(72) Inventors: David J. Pine, New York, NY (US); Yufeng Wang, New York, NY (US); Yu Wang, New York, NY (US); Marcus Weck, New York, NY (US)

(73) Assignee: New York University, New York, NY (US)

( * ) Notice: Subject to any disclaimer, the term of this patent is extended or adjusted under 35 U.S.C. 154(b) by 0 days.

(21) Appl. No.: 14/438,862

(22) PCT Filed: Oct. 28, 2013

(86) PCT No.: PCT/US2013/067051
§ 371 (c)(1),
(2) Date: Apr. 27, 2015

(87) PCT Pub. No.: WO2014/070652
PCT Pub. Date: May 8, 2014

(65) Prior Publication Data
US 2015/0290611 A1 Oct. 15, 2015

Related U.S. Application Data

(60) Provisional application No. 61/719,769, filed on Oct. 29, 2012.

(51) Int. Cl.
| | |
|---|---|
| *C08F 255/02* | (2006.01) |
| *B01J 13/00* | (2006.01) |
| *B01J 13/14* | (2006.01) |
| *C08F 112/08* | (2006.01) |
| *C08F 212/08* | (2006.01) |
| *C08F 279/02* | (2006.01) |

(52) U.S. Cl.
CPC ............ *B01J 13/00* (2013.01); *B01J 13/0039* (2013.01); *B01J 13/14* (2013.01); *C08F 112/08* (2013.01); *C08F 212/08* (2013.01)

(58) Field of Classification Search
CPC ............................ C08F 255/02; C08F 279/02
USPC .................... 525/54; 424/78.2; 435/180, 189
See application file for complete search history.

(56) References Cited

U.S. PATENT DOCUMENTS

| | | | | |
|---|---|---|---|---|
| 2012/0214001 | A1* | 8/2012 | Little ........................ | B01J 13/18 428/403 |
| 2013/0236416 | A1* | 9/2013 | Rungta .................. | C08F 138/00 424/78.27 |

OTHER PUBLICATIONS

International Search Report and Written Opinion for PCT/US2013/067051; mailed Mar. 6, 2014; 7 pages.
Pine, David, Colloidal Self Assembly II: Pacmen & Multivalent Colloids, Online, 2012 Boulder Summer School, Jul. 25, 2012, 46 pages, Boulder Colorado.
Breed, Dana Rachael, Engineered Colloids: Patchy Particles with Reversible, Directional Interactions, ProQuest 2007, Dated Dec. 2007, pp. 36-37, 39, 43-57, and 61-64.
Kraft Daniela J. et al., Surface roughness directed self-assembly of patchy particles into colloidal micelles, PNAS vol. 109 No. 27, Date Jul. 3, 2012, 15 pages.

* cited by examiner

*Primary Examiner* — Terressa Boykin
(74) *Attorney, Agent, or Firm* — Foley & Lardner LLP (57) ABSTRACT

A method for creating the colloidal analogs of atoms with valence: colloidal particles with chemically distinct surface patches that imitate hybridized atomic orbitals, including sp, sp2, sp3, sp3 d, sp3 d2 and sp3 d3. Functionalized with DNA with single-stranded sticky ends, patches on different particles can form highly directional bonds through programmable, specific and reversible DNA hybridization. These features allow the particles to self-assemble into 'colloidal molecules' with triangular, tetrahedral and other bonding symmetries, and should also give access to a rich variety of new microstructured colloidal materials.

39 Claims, 10 Drawing Sheets

COLLOIDS WITH VALENCE: FABRICATION, FUNCTIONALIZATION AND DIRECTIONAL BONDING

CROSS-REFERENCE TO RELATED PATENT APPLICATIONS

This application is a 371 National Stage of PCT Patent Application No. PCT/US2013/067051, filed Oct. 28, 2013, which claims priority to U.S. Provisional Application No. 61/716,769 filed Oct. 29, 2012, herein incorporated by reference in their entirety.

GOVERNMENT RIGHTS

This work was supported by the MRSEC Program of the National Science Foundation under Award Number DMR-0820341 and also by the National Science Foundation Grant ChE-0911460.

FIELD OF THE INVENTION

This invention is directed to compositions of matter, and also articles and methods of manufacture related to assembly of colloidal particles having specific directional bonding. More particularly the invention is directed to a method for making selectable colloidal analogues of atoms having valence characteristics, including forming colloidal particles with chemically functionalized patches which form specific directional bonds through non-covalent interactions.

BACKGROUND OF THE INVENTION

Self-assembly of colloidal particles is of great interest and importance due to its potential applications in many fields of use, such as for example, biomaterials, catalytic supports, atomic/molecular phase behavior study and photonics. The ability to design and assemble 3-dimensional structures from colloidal particles is limited by the absence of specific directional bonds. As a result, complex or low-coordination structures, common in atomic and molecular systems, are rare in the colloidal domain.

The past decade has seen an explosion in the kinds of colloidal particles that can be synthesized. A wide variety of new shapes have been made, from rods and cubes to clusters of spheres and dimpled particles and also other types of anisotropic particles including Janus particles, branched particle, triangles and polyhedrons. The self-assembly of such building blocks is largely controlled by their geometry, and thus, only a few relatively simple crystals have been made: face-centered and body-centered cubic crystals and variants. Colloidal alloys increase the diversity of structures, but many structures remain difficult or impossible to make. For example, the diamond lattice, predicted more than 20 years ago to have a full 3-dimensional photonic band gap, still cannot be made by colloidal self-assembly because it requires fourfold coordination. Without directional bonds, such low-coordination states are unstable.

In contrast to colloids, atoms and molecules control their assembly and packing through valence. In molecules like methane ($CH_4$), the valence orbitals of the carbon atom adopt $sp^3$ hybridization and form four equivalent C—H bonds in a tetrahedral arrangement. In the colloidal domain, the kinds of structures that could be made would vastly increase if particles with controlled symmetries and highly directional interactions were available. Consequently, what is needed are colloids with a form of "valence" characteristic which would advantageously resolve a wide variety of commercial needs heretofore not met.

SUMMARY OF THE INVENTION

The present invention concerns a general method for creating colloidal analogues of atoms with valence. Colloidal particles with chemically functionalized patches can be established to form highly specific and directional bonds. The "valences" of these new "colloidal atoms" possess virtually all the common symmetries—and some uncommon ones—characteristic of hybridized atomic orbitals, including without limitation, s, p, sp, $sp^2$, $sp^3$, $sp^3d$, $sp^3d^2$, and $sp^3d^3$. In this methodology various patches (amidinated and carboxyl) can be applied to achieve these features wherein the chemical functionality of the patches is programmable and specific using synthetic organic or biological molecules and macromolecules with supramolecular interactions. For example, tri-block copolymers with metal coordination terminals, DNA with single-stranded "sticky ends" are functionalized on particle patches, thereby creating colloidal atoms from which different kinds of "colloidal molecules" can be assembled. Because the bonds between these new colloidal atoms are highly directional and fully controllable (length scale, strength and reversibility), they open up the possibility of building new low-coordinated open structures, both amorphous and crystalline, which is emerging as a key design feature for assembling colloids with photonic band gaps and also for achieving other "valence" sensitive structures. For example, tetravalent particles can form a three dimensional colloidal diamond lattice, and trivalent particles can form a two dimensional Kagome structure.

BRIEF DESCRIPTION OF THE DRAWINGS

FIGS. 4a and b show electron micrographs of patchy particles and that the sizes of patches can be adjusted by changing encapsulation conditions; FIG. 4a in particular shows particles with relatively large patches which are fabricated when clusters are swollen with 1.0 mL of styrene monomer; primary spheres are 540 nm in diameter; FIG. 4b shows under identical conditions of FIG. 4a, but smaller patches are obtained when more monomer, 1.2 mL, is added.

FIGS. 5a-5c show the number distribution of the patchy particles and their separation with FIG. 5a shows an electron micrograph of a mixture of amidinated patchy particles before they are separated by density gradient centrifugation; particles of the same order n have the same configuration and some of the higher order (n>7) particles are circled; their patch geometries extend beyond those of atomic orbitals. (Scale bar, 2 μm.); optical micrographs are shown in FIGS. 5b and 5c of test tubes containing patchy particle suspensions fractionated by density gradient centrifugation; and each white band represents a region of high concentration of identical patchy particles, wherein in FIG. 5b patchy particles are fabricated from clusters using high shear, resulting in the formation of relatively more lower valence particles; eight bands are visible with the highest number being the monovalent patchy particles; in FIG. 5c shows patchy particles fabricated from clusters using low shear; this results in the formation of a greater percentage of patchy particles with higher valence; twelve distinct bands corresponding to patchy particles, from monovalent to 12-valent, are visible, with the most pronounced band corresponding to trivalent patchy particles;

FIGS. 7a-7d show the functionalization of the particle patches by esterification; in FIG. 7a is shown a fluorescent microscopic image of carboxyl patchy particle after attachment of —OH dye molecules.

FIGS. 8a-f show bright field (left), confocal fluorescent (middle), and schematic images (right), of colloidal molecules self-assembled from patchy particles; FIG. 8a shows complementary green and red monovalent particles form dumbbell-shaped AB type molecules. Supra-colloidal molecules $AB_2$, $AB_3$, and $AB_4$ are formed by mixing red monovalent with green; (FIG. 8b) divalent; (FIG. 8c) trivalent; and (FIG. 8d) tetravalent particles; FIG. 84f shows when particles with bigger patches are used, cis-trans-like isomers can form; introducing more monovalent particles leads to ethylene-like colloidal molecules. (Scale bars, 2 μm);

FIGS. 9a and b show schematic images and snapshots from movies with step-by-step reactions between colloidal atoms; bent arrows point from the colloidal atom to the site where it is going to attach; straight arrows indicate time sequence; FIG. 9a also shows monovalent particles attaching to tetravalent particle, one by one, forming an $AB_4$ type colloidal molecule.

FIGS. 10a-10c show the self-assembly and dissociation of pincer and pyridine functionalized divalent particles triggered by addition of $AgBF_4$ and triphenylphosphine; FIGS. 10a, b and c (left panel) show bright field images and FIG. 10d right panel shows the schematic images of stepwise interactions of 10a-10c.

DETAILED DESCRIPTION OF PREFERRED EMBODIMENTS

Figure 1:
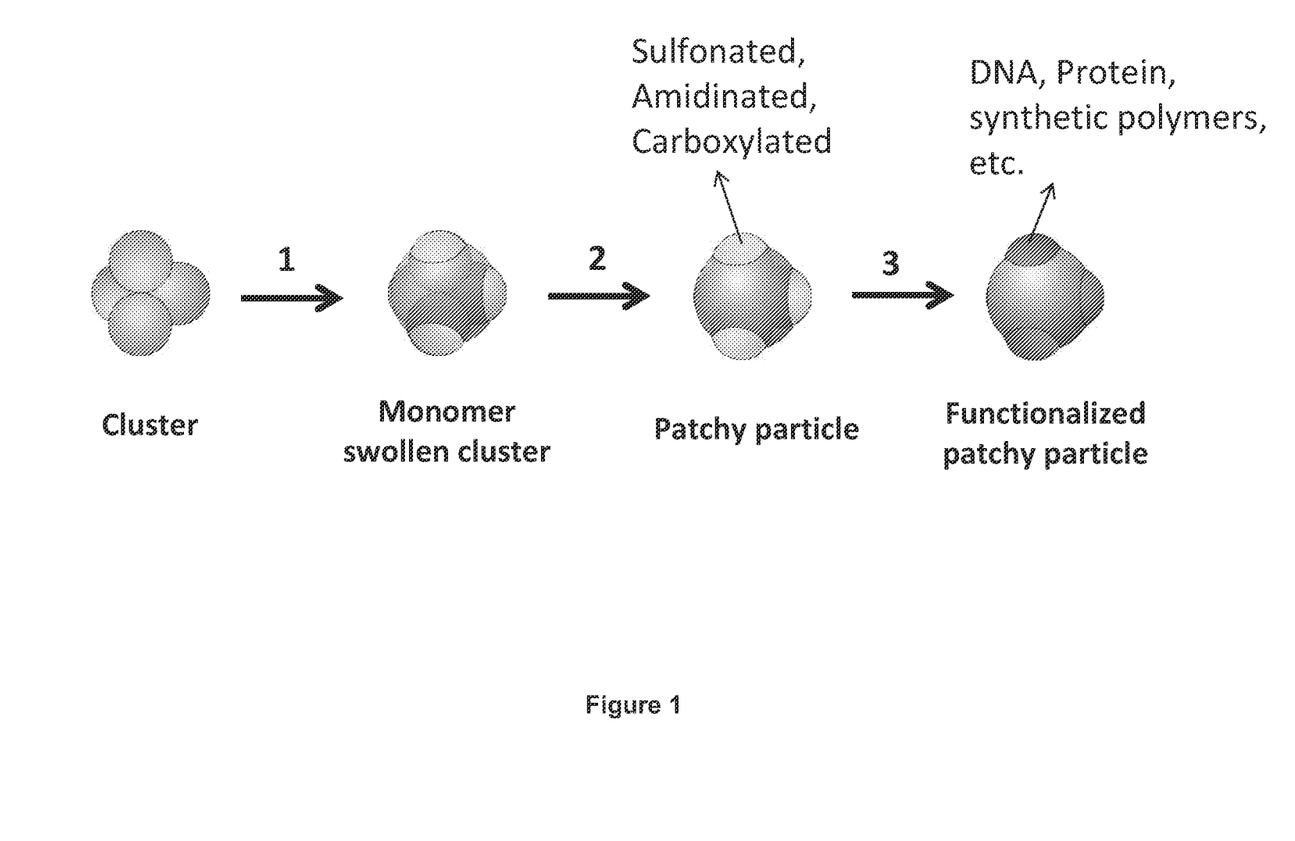
FIG. 1 shows a scheme illustrating the preparation of colloidal particles with functionalized patches (synthetic or biological molecules and macromolecules) with well-defined symmetries; a 4-patch particle is shown as an example. (1) a cluster of 4 polystyrene microspheres, prepared by a conventional method is swollen with styrene such that the extremities of the cluster, a tetrahedron in this case, protrude from the styrene droplet; (2) the styrene is then polymerized and the protrusions from the original cluster become patches with at least one of the surface properties: sulfonated, amidinated or carboxylated; (3) depending on the type of surface property, the patches are functionalized with small molecules, polymers, protein or oligonucleotides, using non-covalent and covalent coupling methods.
Figure 2A:
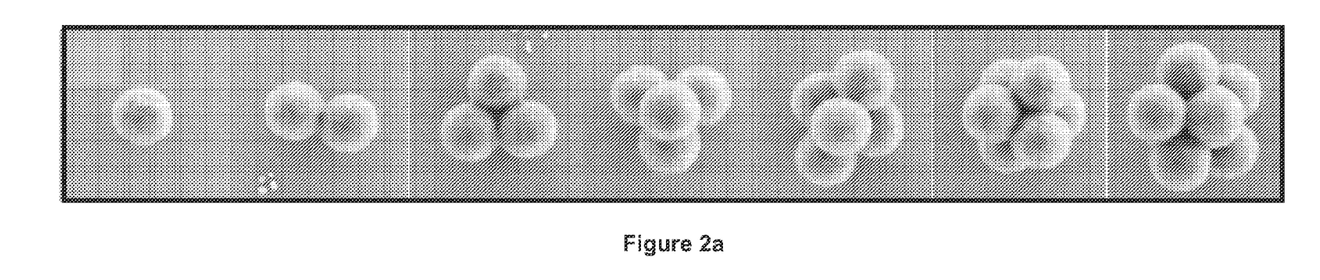
FIG. 2a shows electron micrographs of colloidal clusters (amidinated particles are taken as an example), showing the particle configurations for clusters of n=1 to 7 microspheres.

In one preferred embodiment the fabrication and functionalization of patchy particles is summarized in FIG. 1. Specifically, the fabrication can begin with preparing cross linked polystyrene microspheres (with at least one of amidinated, carboxylated or sulfonated surface functionality); and these microspheres are preferably micrometer or sub-micrometer in diameter. Small clusters of these microspheres can be assembled using a conventional emulsion-evaporation method. This process produces so-called "minimal-moment" clusters with reproducible symmetries and configurations: for example, some such symmetries include without limitation spheres, dumbbells, triangles, tetrahedra, triangular dipyramids, octahedra, and pentagonal dipyramids, for clusters of n=1 to 7 particles (see FIG. 2a for amidinated clusters as a specific example).

Figure 3A:
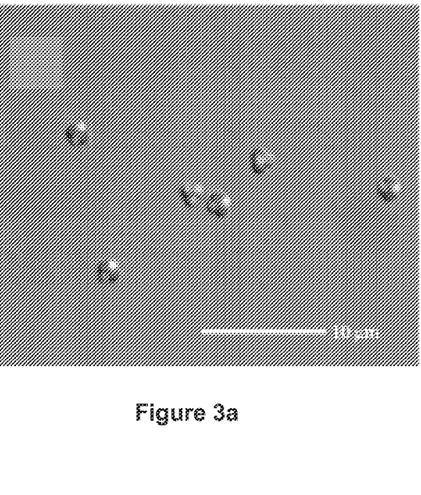
FIGS. 3a-3c show optical microscope bright-field images of sulfonated cluster tetramers before swelling (FIG. 3a); swollen with styrene (FIG. 3b) and after styrene is polymerized (FIG. 3c). Purified particles are shown to demonstrate that clusters of the same order can be swollen by the same amount of styrene, leading to same configuration of the resulting patchy particles.
Figure 3B:
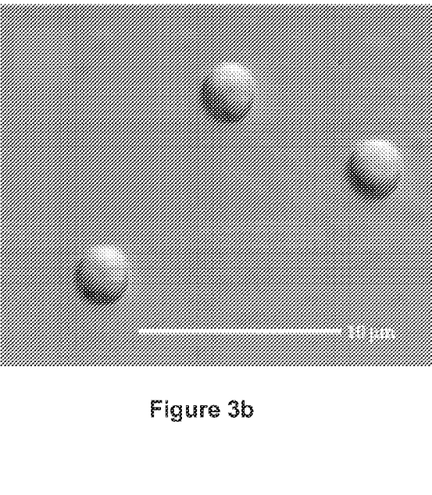

Patchy particles are formed from the clusters preferably using a two-stage swelling process followed by polymerization. First, a low-molecular weight, water-insoluble organic compound (1-chlorodecane) is introduced into the colloidal clusters that are suspended in water with surfactant (sodium dodecyl sulfate, SDS). Adding a small amount of acetone to the suspension aids in the transport of the 1-chlorodecane into the colloidal clusters. Subsequent stripping of the acetone from the solution traps the 1-chlorodecane in the polymer clusters. An oil-soluble initiator, such as, benzoyl peroxide (BPO) (or Azobisisobutyronitrile, AIBN) and 1,2-dichloroethane, are introduced which dissolves the initiator and is miscible with 1-chlorodecane. The clusters are then swollen by a styrene monomer. The 1-chlorodecane which has been introduced earlier acts as an osmotic swelling agent that increases the amount of monomer that can be absorbed by the clusters. Since each cluster of a given number of particles contains the same amount of swelling agent, chemical equilibrium assures that different clusters of the same size all swell by about the same amount, with the total amount of swelling controlled by the quantity of added monomer. The bright-field optical images of clusters and styrene swollen clusters are shown in FIGS. 3a and b, sulfonated particles are chosen as a specific example.

Figure 2B:
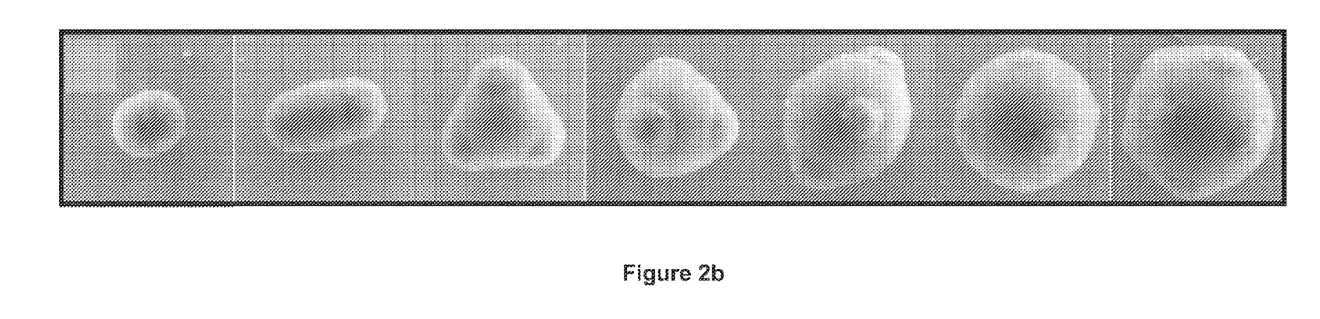
FIG. 2b shows electron micrographs of amidinated patchy particles after encapsulation. The patches inherit the symmetries of their parent clusters.
Figure 3C:
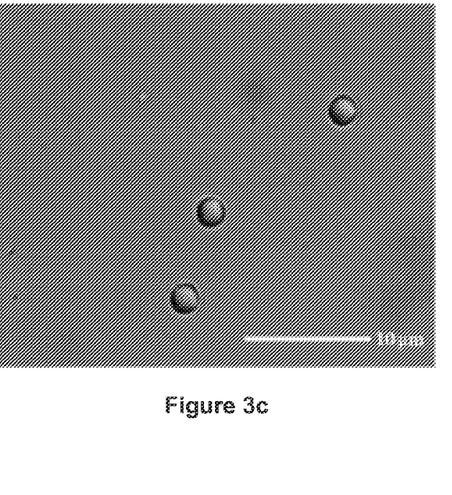

After swelling, the styrene is polymerized by thermally degrading the initiator previously introduced into each cluster (FIG. 3c). Swelling is controlled so that the extremities of the original clusters are not encapsulated, but are left as patches. Clusters of the same order n are encapsulated to the same extent, leading to uniform patch configurations. Using initiators such as BPO ensures that there are no functional groups introduced, so the surface created by swelling the clusters—the "anti-patch" surface—is chemically inert and different from the patches. Only the patches have the amidinated, carboxylated or sulfonated functional groups. As can be seen in FIG. 2b, the particles have distinct patches; and their morphology is well characterized by SEM.

Figures 4A, 4B:
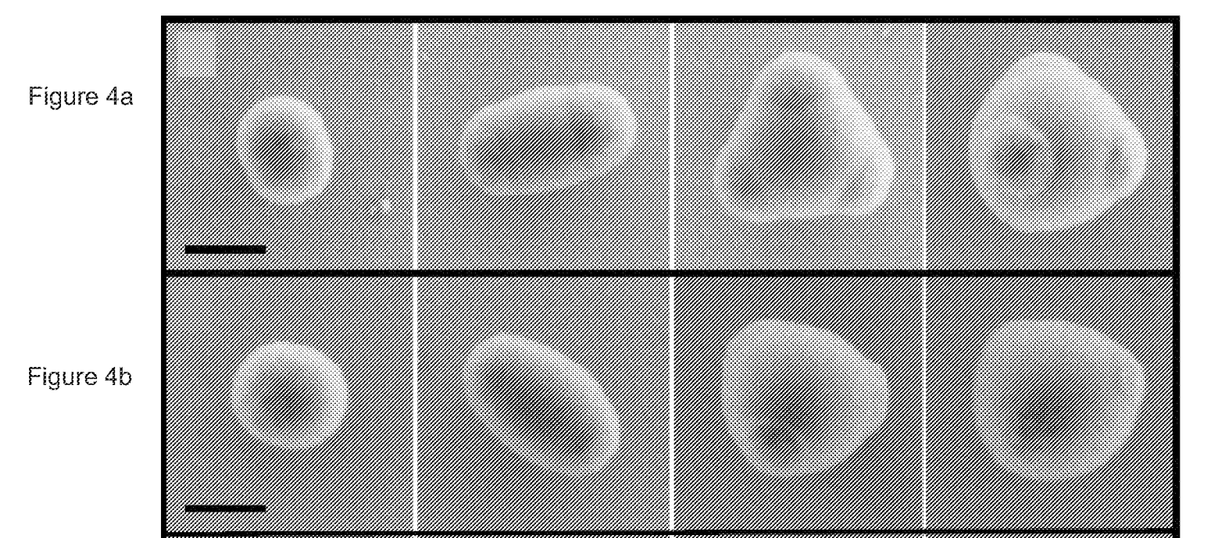
Figure 4C:
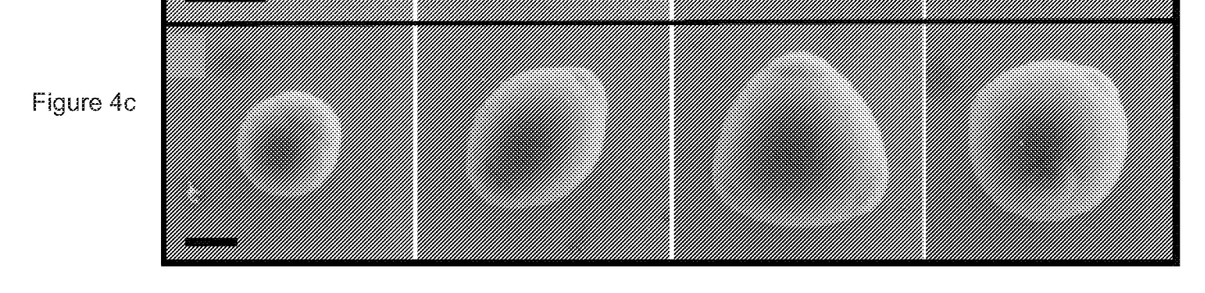
FIG. 4c shows smaller patches, relative to particle size, obtained using primary microspheres 850 nm in diameter; using larger particles facilitates observation under an optical microscope; divalent, trivalent and tetravalent particles from this batch are used in the colloidal molecule formation, and the monovalent particles are used in kinetics study (the arrow indicates decreasing patch size. Scale bars, 500 nm.)

Patch size is controlled during the swelling process by adjusting the amount of monomer that is introduced: the more monomer that is added, the smaller the patches are. FIGS. 4a-4c show that considerable variation in patch size can be achieved in this way. Small patches favor greater directionality, while larger patches permit multiple links per patch.

Figure 5A:
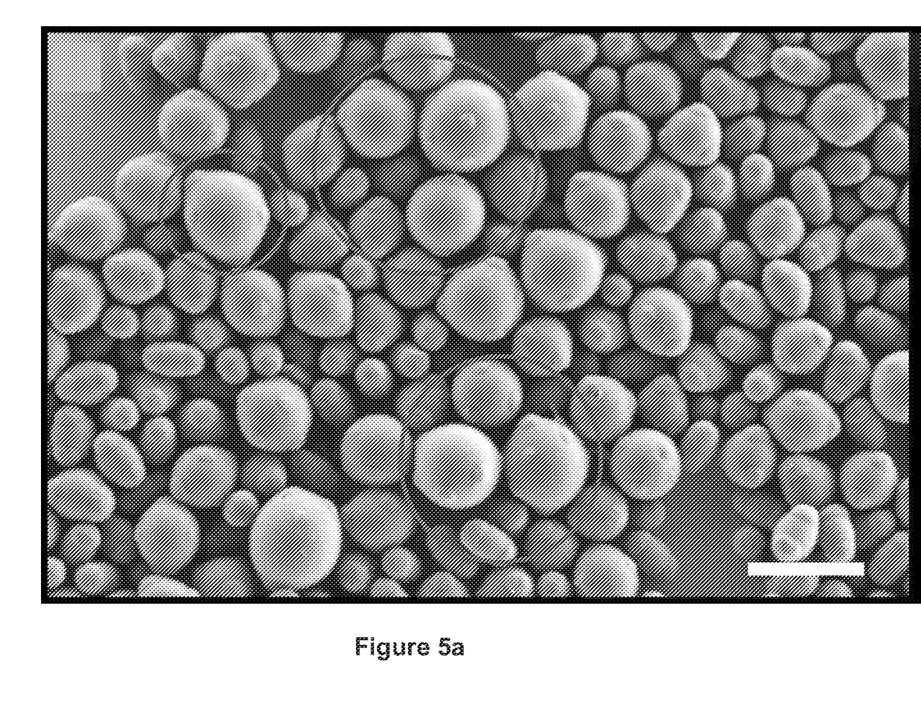
Figures 5B, 5C:
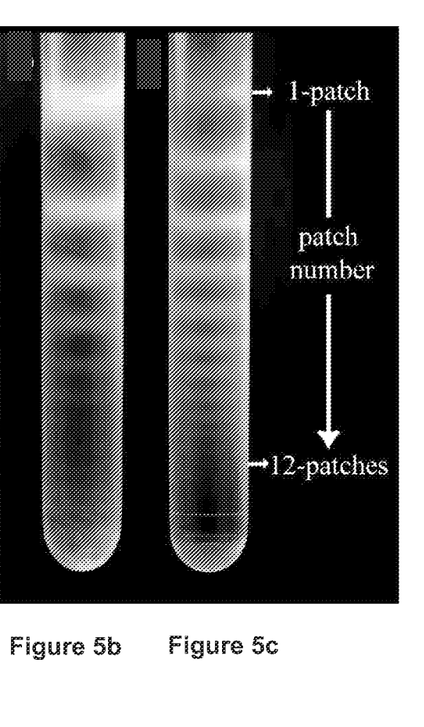

This method will provide samples containing large scalable quantities of particles having different "valence" (numbers of patches, FIG. 5a). Essentially all the starting colloidal particles are converted into particles with one or more such patches. Adjusting the emulsification conditions used when making the clusters changes the relative distribution of particles with different valence. Using a higher shear rate, for example, makes smaller emulsion droplets, which skews the distribution towards lower-valence particles. To fractionate the particles, we use density gradient centrifugation, obtaining up to twelve clear bands corresponding to particles with different valence (see FIGS. 5b and c). The Table below summarizes the fraction of particles obtained in each band for two different shearing conditions. For the lower shear preparation, each of the four upper bands, which correspond to particles with 1 to 4 patches, contains 108 to 109 identical particles. For the higher shear preparation, greater quantities are produced in the upper bands and lower quantities are produced in the lower bands. In most cases, conditions are used that produce the most 2-, 3- and 4-patch particles, which are most advantageous for making analogues of common molecules.

Table 1 shows the quantities of particles in the different bands. Density gradient centrifugation is used to fractionate the patchy particles. The fraction of identical particles obtained from a single centrifuge tube is shown in the Table. Fractions of 10%-20% correspond to $10^8$~$10^9$ particles in a single fractionation. Up to 3% of the particles appear in higher order bands comprising particles with 8-12 patches. The remainder of the particles, up to 20%, accumulates as sediment at the bottom of the centrifuge tube. This consists primarily of particles with 1 to 7 patches and can be recovered and purified by a second density gradient fractionation. These fractions were estimated from their number ratio relative to lower valence particles observed under a microscope.

TABLE 1

| | Number of patches | | | | | | |
|---|---|---|---|---|---|---|---|
| | 1 | 2 | 3 | 4 | 5 | 6 | 7 |
| High shear | 61% | 15% | 4% | 1% | 0.2%* | 0.02%* | 0.001%* |
| Low shear | 7% | 16% | 25% | 15% | 8% | 5% | 3% |

In a most preferred embodiment a key design feature of our method is the use of clusters as intermediates. The charged functional groups (sulfonated, amidinated and carboxylated) on the colloid surface are important to the patchy particle fabrication process. First, the positive/negative charge, along with the SDS surfactant, stabilizes the microspheres as well as the clusters by electrostatic repulsion. Moreover, when the clusters are swollen and encapsulated, the charges make the patches of the cluster more hydrophilic than the monomer-water interface, which is stabilized only by SDS. This difference in interfacial energies leads to finite contact angles and well-defined patches. Also, the clusters' diversity in particle number and symmetry, surface functionality are all translated directly to the number (1, 2, 3-patches etc.) and symmetry (linear, triangular, tetrahedral, etc.) and the functionality (amidinated, carboxylated, and sulfonated) of the particle patches. Examples 1-3 provided hereinafter illustrate preparation of amidinated, carboxylated and sulfonated patchy particles, respectively.

In another aspect of the invention patchy particle functionalization can be carried out as described hereinafter. For example, patchy particles can be site-specifically functionalized due to the presence of amidine or carboxylic acid groups on the patch surface. Site-specific functionalization the particle patches with small molecules, synthetic polymers and biological materials bearing recognition units ("RU" hereinafter) will enable the directional interactions required for particular self-assembled structures. Either a covalent or non-covalent, or a strategy combing both can be employed.

The amidinated patches can be functionalized with biotin, to which DNA with single-stranded "sticky" ends is attached using a biotin-streptavidin-biotin linkage. Sulfo-NHS-Biotin (Biotinamidohexanoic acid 3-sulfo-N-hydroxysuccinimide ester sodium salt), is a water-soluble biotin derivative which can be used to be attached to the patchy particles. This step is preferably carried out in buffer solution, (Phosphate-buffered saline, PBS, pH=7.42), where the N-hydroxysuccinimide ester (NHS) can react with amidine groups and covalently link the biotin to the patches. Triton X-100, a non-ionic surfactant, is used as well. This small molecules surfactant can absorb onto patchy particle surface and stabilize the particle by steric repulsion. However, they are short enough that the patches can still be functionalized with biotin.

Figure 2C:
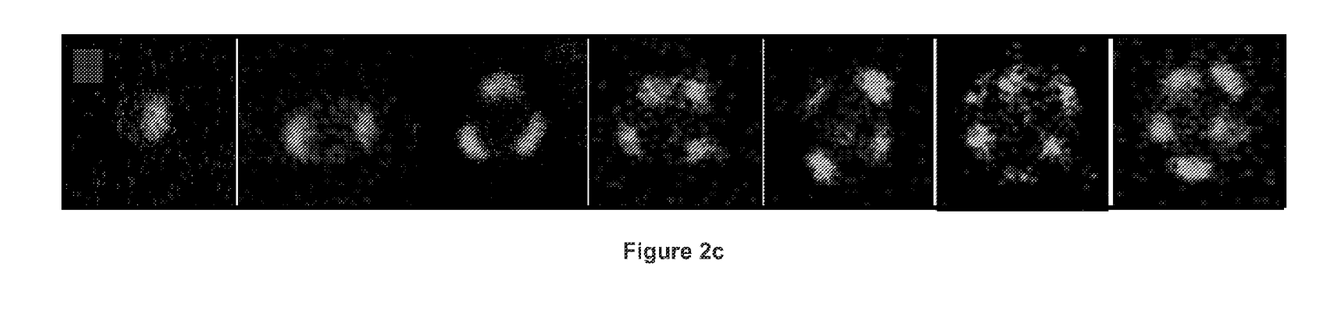
FIG. 2c shows confocal fluorescent images verifying the functionalization of DNA oligomers on patchy particles; the fluorescence comes from the dye-labeled streptavidin that links DNA with the patches. (Scale bar, 500 nm)

The DNA oligomer is prepared separately and it has three parts. At the 5' end, it has a biotin as an anchoring molecule and in the middle, a 49 base-pair double helix is present as a spacer. Finally, a single strand of 11 complementary or 8 palindrome base pairs is located at the 3' terminus, forming the sticky end. Streptavidin acts as a connector to link the DNA to the patches. Specifically, in the preferred embodiment DNA is first mixed with streptavidin in a 1:1 ratio, to form a streptavidin-DNA complex. This complex is then mixed with the biotin-functionalized patchy particles, thus producing DNA-functionalized patchy particles. The streptavidin contains a fluorescence tag so that it can be visualized using confocal microscopy. The resulting product is shown in FIG. 2c. Only the patches of the particle show fluorescence, indicating the streptavidin-DNA complex successfully coats the particle patches, and the amidine-NHS chemistry used for biotin functionalization performs as designed. This method efficiently produces DNA functionalized patchy particles. Meanwhile, biotin (small molecule) conjugated patchy particle and streptavidin (protein) conjugated patchy particles can be fabricated as intermediates, which are also very useful in colloidal assembly. An example of this methodology is provided hereinafter as Example 4.

In another aspect of the invention functionalization of carboxylated patchy particles is carried out under the assistance of a coupling reagent N-(3-Dimethylaminopropyl)-N'-ethylcarbodiimide hydrochloride (EDC). EDC is used to conjugate carboxylic acid with primary alcohol (—$CH_2OH$) or amine (—$CH_2NH_2$) in water and various organic solvents. In aqueous solution, patchy particles are functionalized with streptavidin or nucleotide with primary amine terminals by forming covalent amide bonds, which creates protein/nucleotide conjugated patchy particles.

Figure 6A:
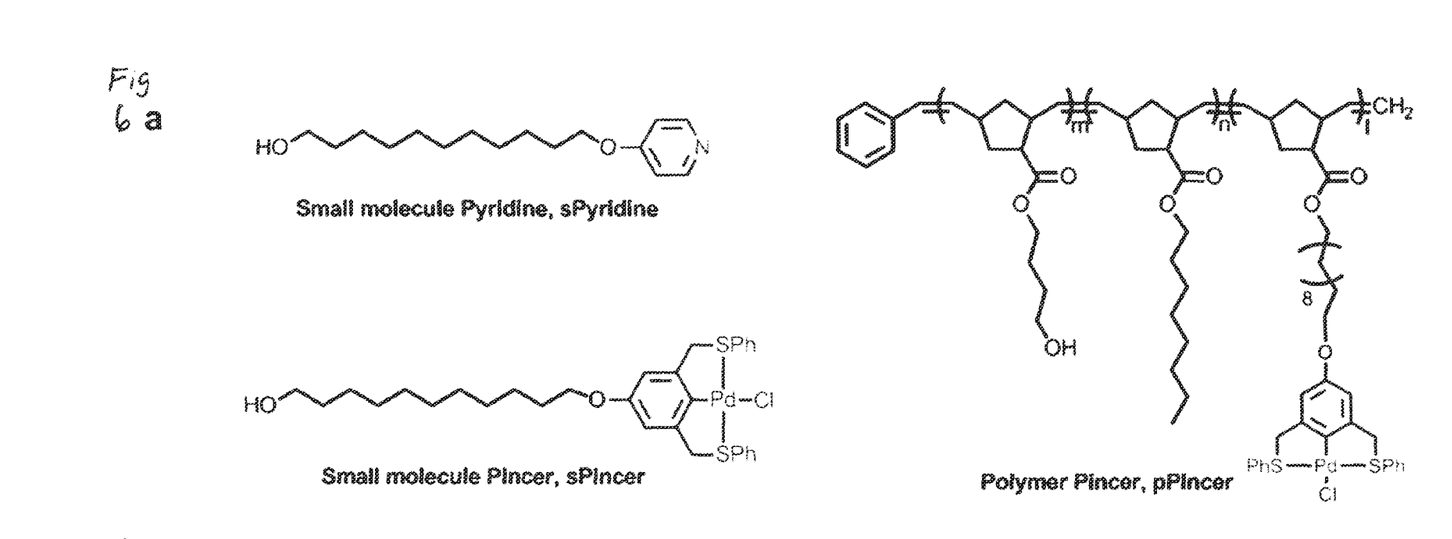
FIG. 6a shows the small molecules and tri-block copolymer bearing —OHs anchoring groups as well as palladated pincer or pyridine as metal coordination groups.

In organic solvents, such as tetrahydrofuran (THF), synthetic small molecules and polymers bearing —OH groups are disposed on the patches by EDC coupling. A series of small molecules and polymers designed and synthesized for this purpose are listed in FIG. 6a. These molecules and macromolecules have common features and consist of 3 parts, namely primary alcohol (—CH$_2$OH) groups, an RU at the opposite end of the molecule and a spacer located therebetween.

The small molecules, sPincer and sPyridine were prepared by multiple step organic synthesis. The triblock copolymer pPincer was synthesized by ring-opening metathesis polymerization ("ROMP" hereinafter) of functional norbornene monomers sequentially using Grubbs 1$^{st}$ catalyst. The length of the polymer and the ratio of different blocks (corresponding to the numbers for m, n, l in FIG. 6a) can be changed by varying the amount of Ruthenium catalyst and monomers. ROMP is a living polymerization methods including ATRP (atom transfer radical polymerization), RAFT (reversible addition-fragmentation chain-transfer polymerization) and NMP (nitroxide mediated radical polymerization) can also be employed by which the molecular weight, polydispersity and functionality of the resulting polymers can be well controlled.

There are three advantages when THF is used. First, supramolecular recognition units, such as hydrogen bonding and metal coordination, can achieve sufficient association strength in THF, which is needed to assemble the anisotropic particles into entropically unfavorable configurations. Second, the EDC coupling reaction can be carried out in organic solvent with ease and high yield. EDC decomposes in water gradually, while in organic solvent, it has much higher efficiency. Finally, if patchy particles with crosslinked matrix are used, although swollen, the shapes of the patchy particles are preserved in THF. FIGS. 7a-7d show an example of the successful covalent attachment of a fluorescence molecule on carboxylated patchy particle on the patches. Covalent functionalization can provide particles which are more stable under different conditions such as heat, solvent switching. The number and density of surface functionalization stay constant. Examples 5 and 6 provided hereinafter describe carboxyl patchy particle functionalization and use of an organic small polymer/triblock copolymer with RU, respectively.

In another aspect of the invention, self-assembly of patchy particles by directional non-covalent interactions can be accomplished. Bonding between particles occurs through patch-patch interactions, and thus the location and functionality of the patches can endow particles with bonding directionality and "valence." Self-assembly of those patchy particles is realized by non-covalent interactions, i.e., hydrogen bonding and metal coordination and columbic interactions. Examples of DNA hybridization and palladated pincer-pyridine coordination are discussed below.

DNA is widely used for linking nanoparticles because DNA can be synthesized in a programmable manner with control over the length and sequences of functional groups, which, in turn, controls the specificity and the strength of interaction. DNA oligomers about a few to tens of nanometers in length provide short-range attractions compared to the size of the colloids, and thus enforce the directionality defined by the particle patches. Another advantage of using DNA is that the hybridization of the complementary strands is fully reversible, and the dissociation takes place within a narrow temperature range (T$_m$). Particle self-assembly can thus be manipulated simply by varying temperature and other parameters, such as salt concentration.

Following the strategy mentioned above, purified patchy particles can be formalized with complementary DNA strands, are labeled R and G, or with a palindrome strand, which are labeled P. R strands are designed to bind selectively to G strands and not to other R or P strands. Similarly, G strands bind only to R strands while P strands bind only to other P strands. To differentiate the particles under confocal microscope, red fluorescent (Alexa 647) streptavidin is used together with R particles, while green fluorescent (Alexa 488) streptavidin is used with G particles.

With this collection of DNA patchy particles, a variety of colloidal assemblies can be constructed that mimic molecules and macromolecules not only in geometry, but also in their "chemistry". In those colloidal molecules, divalent, trivalent, and tetravalent particles act as central atoms and monovalent particles can act as ligands, forming several bonds around the central atoms. The interactions between the central atoms and the monovalent particles are highly directional and specific, as evidenced by the fluorescent images in FIG. 8 (middle panel), so that the geometry of the resulting colloidal molecule remains the same as the central atom. Illustrative Examples 7-12 are provided hereinafter.

Figure 6B:
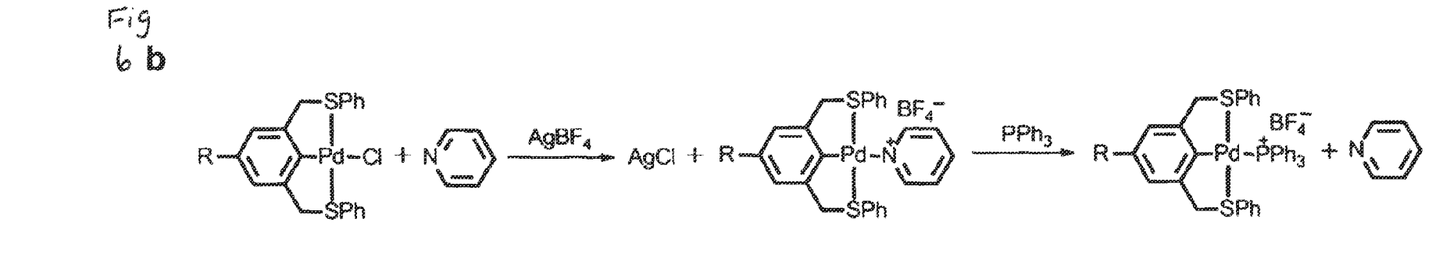
FIG. 6b shows the scheme of palladated pincer-pyridine activation and ligand exchange' palladated pincer-Cl could be activated by addition of silver tetrafluoroborate in order to realize metal coordination with pyridine; a stronger ligand, triphenlyphosphine, can replace pyridine and bond to palladium.
Figure 7A:
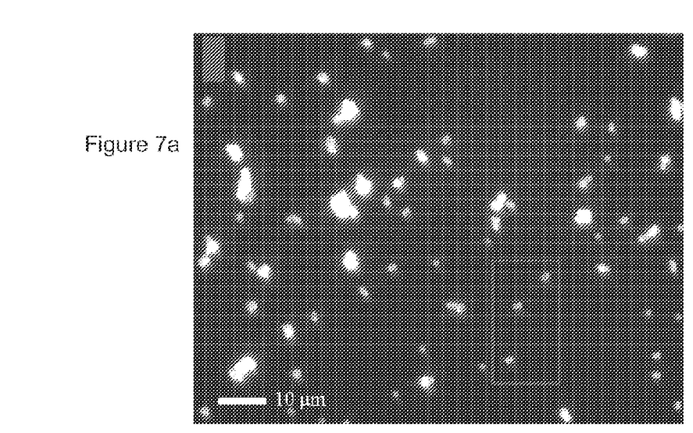
Figure 7B:
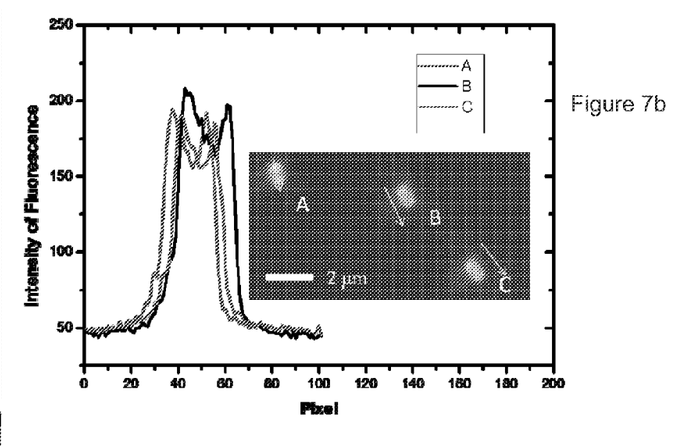
FIG. 7b shows fluorescence intensity measurements of 2-patch particles; the patch part has brighter fluorescence than that of the matrix.
Figure 7C:
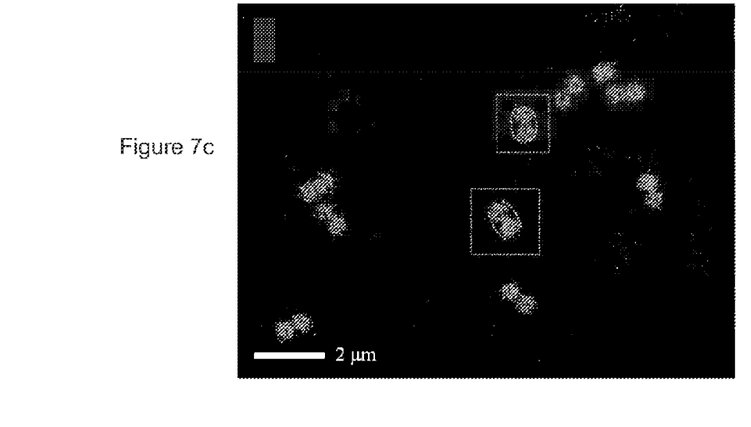
FIG. 7c shows confocal fluorescence image of the dye labeled 2-patch particles showing that only the core clusters are visible.
Figure 7D:
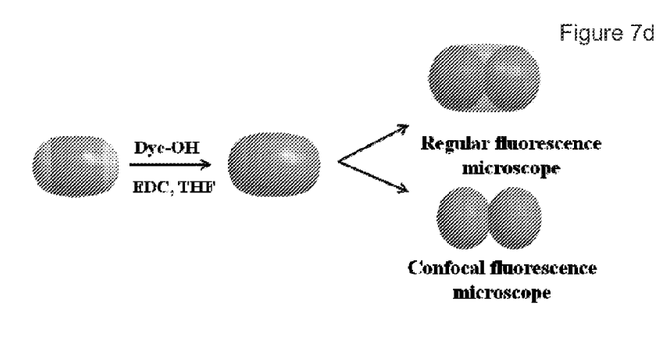
FIG. 7d shows a schematic of the particle functionalization mechanism in THF.

On the other hand, palladated pincer-pyridine metal coordination is used for patchy particle assembly. The palladated pincer complex is a particularly useful molecular recognition unit because it has only one open coordination site accessible and can undergo fast and quantitative self-assembly with different ligands such as pyridine. Stronger ligand, such as triphenylphosphine can bind to the palladium and release pyridine (FIG. 6b). The self-assembly of the particles can be triggered by simply adding AgBF$_4$, and broken by adding another stronger ligand. This allows us to turn on and off the assembly easily. Also, incorporation of metals such as palladium into colloidal particles would bring electric and magnetic properties, thus creating multifunctional and smart materials. Illustrate Example 13 is provided hereinafter.

Figure 9A:
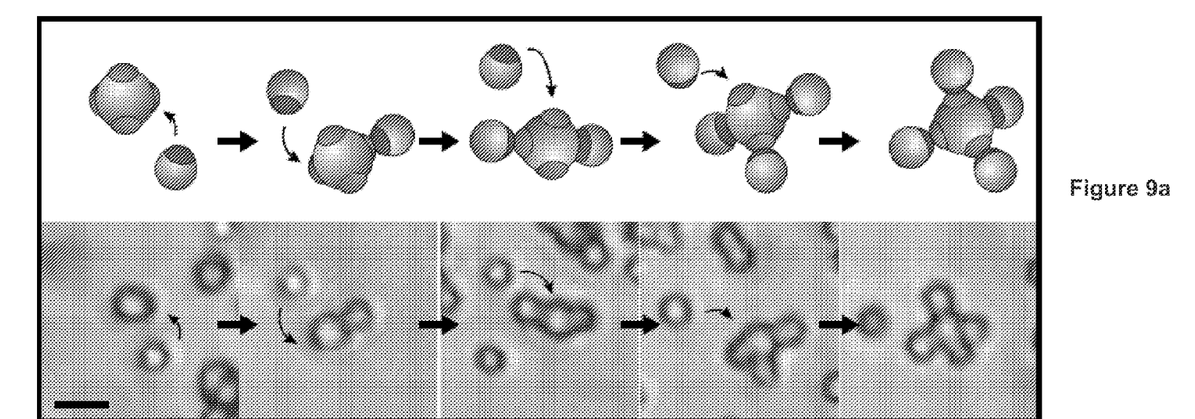
Figure 9B:
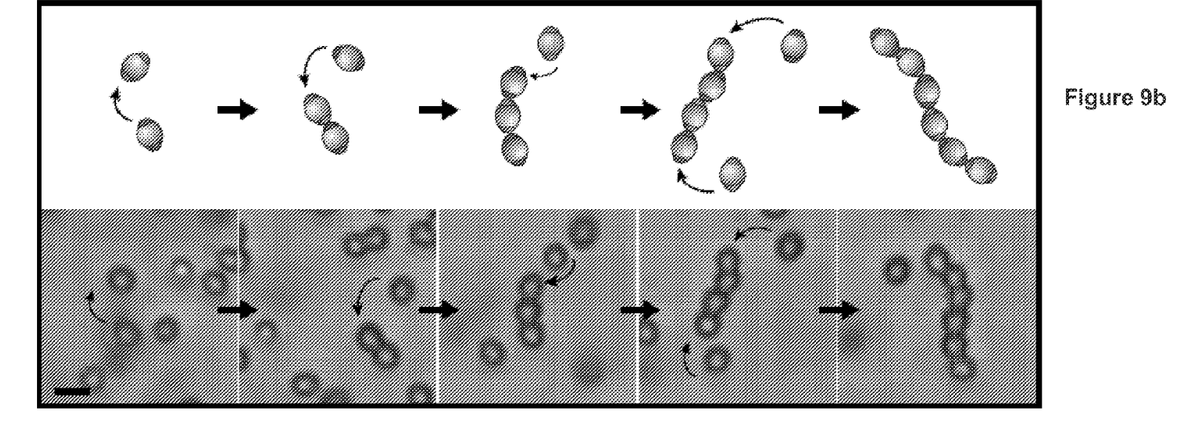
FIG. 9b shows complementary divalent particles polymerizing into a linear chain structure. (Scale bar, 2 μm)

The self-assembly of colloidal atoms into molecules can be viewed as "colloidal reactions" or more generally as "supracolloidal chemistry". Like conventional chemical reactions, colloidal particles with a particular morphology and binding capacity can be used as reagents, and mixed together stoichiometrically. For one example, 4 equivalents of monovalent and 1 equivalent of complementary tetravalent particles can be used to fabricate AB4 colloidal molecules. The colloidal molecule formation and divalent particle polymerization follows a stepwise kinetics. As shown in FIG. 9a, the formation of an AB$_4$ molecule proceeds by the central tetravalent particle picking up monovalent particles, one at a time. In the case of divalent particle chain formation, the "polymerization" also follows a step-growth mechanism. FIG. 9b illustrates how a polymer chain can be extended by adding divalent particles one by one at the end. Alternatively, two polymer chains can fuse into a longer chain.

The ability to design colloidal particles with directional interactions with a wide variety of well-controlled symmetries opens a new spectrum of structures for colloidal self-assembly, taking one beyond colloidal assemblies whose structures are defined primarily by repulsive interactions and colloidal shape. These colloidal particles with a designed "valence" feature can assemble, not only into molecular analogues, but also into other symmetries not available in molecular or crystalline systems. This versatility is demonstrated, for example, by the ability to construct colloidal phases of tetrahedrally coordinated glasses, diamond type crystal phases and "empty" liquids. Furthermore, the use of non-covalent interactions such as DNA hybridization for the attractive interactions between particle patches creates interactions that are both specific and reversible. These types of degrees of freedom and specificity mean that colloids with different properties, such as size, color, and chemical functionality, can be attached in well-defined sequences and orientations. For example, materials can include photonic crystals with programmed distributions of defects and 3-D electrically wired networks. By varying the temperature, concentration, and other reaction conditions, other new design principles can be developed and applied. These types of patchy colloids introduced herein expand the meaning of "colloidal chemistry" and bring us to a point where colloids can be assembled with as much complexity and selectivity as for most atoms and molecules and in some cases exceed the complexity and selectivity of atoms and molecules which are constrained by the laws of science that govern atomistic bonding.

In the following Examples section, various non-limiting examples illustrate a number of aspects of the invention.

EXAMPLES

Example 1

Typically, 10 mL of the amidinated cluster suspension (1% w/w, pH=2.93, 540 or 820 nm in diameter) was charged into a 50 mL 2-neck flask along with a magnetic stir bar. The flask was submerged in an oil bath and the temperature was set to 35° C. 1 mL of acetone was added and the suspension was stirred at 300 rpm. In a separated glass vial, 50 mg of benzoyl peroxide were dissolved in 0.63 mL of 1,2-dichloroethane. Then, 0.88 mL of 1-chlorodecane was added to the vial followed by the addition of 5 mL of an aqueous solution of 0.1% SDS. The resulting mixture was then vortexed to create an emulsion, from which 200 μL were added to the cluster suspension. The resulting mixture was stirred for 12 hours at 35° C. Then, the acetone was removed via evaporation under reduced pressure (30 mmHg). The flask was equipped with a condenser containing an oil bubbler at the top. Using a needle, nitrogen was bubbled through the suspension for 30 minutes. Then, 1 mL of styrene (with inhibitor removed) was added and allowed to swell the clusters. After 2 hours, the temperature was raised to 65° C. to initiate polymerization. The polymerization was allowed to take place for 14 hours. Then, the reaction was cooled to room temperature, which terminates the polymerization, yielding the desired patchy particles as a mixture.

Example 2

Typically, carboxylated cluster suspension (0.5% w/w, pH=9.5, 620 nm in diameter) was used. In the case of particles dispersed in organic solvents, 3% DVB are used together with styrene when the clusters are swollen. The rest of the fabrication condition is the same as that shown in Example 1.

Example 3

Typically, sulfonated cluster suspension (1%, pH=7.0, 850 nm) was used. The rest of the fabrication condition is the same as that shown in Example 1.

Example 4

Typically, 1 mg of sulfo-NHS-Biotin was charged into a dram vial containing a stir bar. 0.5 mL of patchy particles (particles fabricated in Example 1 are used) of interest was added to the vial and the suspension was allowed to stir for 12 hours. Biotin was used in large excess. Unreacted biotin was removed by washing the functionalized particles six times with an aqueous solution containing 10 mM PBS (pH:7.42, NaCl:100 mM) and 0.1% w/w Triton X-100. The 5'-biotin-DNA was mixed with streptavidin (Life tech., 0.5 mg/mL, green or red fluorescent labeled) in 1:1 molar ratio in a centrifuge tube and agitated for 1 hour. The resulting DNA-streptavidin complex was then attached to the biotin patchy particles. Typically, we added a 100 μL suspension of biotin patchy particles to 10 μL of the DNA-streptavidin complex and agitated the mixture for 3 hours at 25° C. The resulting particles were washed with and dispersed in an aqueous solution of PBS containing 1% w/w Pluronic F127 as surfactant. This dispersion can be stored at 4° C. and directly used for the self-assembly studies.

Example 5

Typically carboxylated patchy particles (100 μL, 0.1% w/w, dispersed in MES buffer, pH 6), 1 mg of EDC and 10 μL of streptavidin (Life tech., 0.5 mg/mL, green or red fluorescent labeled) were charged into a dram vial containing a stir bar. The suspension was allowed to stir for 12 h. After washing by centrifugation/redispersion in PBS containing 0.1 Triton-X100, streptavidin conjugated patchy particles were produced.

5'-biotin-DNA was mixed together with streptavidin patchy particle in PBS Triton solution, yielding DNA patchy particles.

Instead of using a streptavidin linker, DNA can also be attached to carboxylated patchy particles by EDC coupling. 5'-Amino-DNA (DNA with an amine group modified on the 5' terminal) used. In this case, the DNA was linked to the particle by a covalent amide bond.

Example 6

Carboxylated patchy particles (fabricated in Example 2 with 3 crosslinking) are transferred and dispersed in THF. 10 μL of the particle suspension was charged in a dram vial along with a stir bar. 1 mg of EDC was added in the vial and the mixture was allowed to stir for 10 min. And then 1 mg of sPincer (or sPyridine, pPincer) was first dissolved in 10 μL of THF and then added into the vial. After overnight reaction, the particles are washing intensively in the THF by centrifugation/dispersion.

Example 7

Figure 8A:
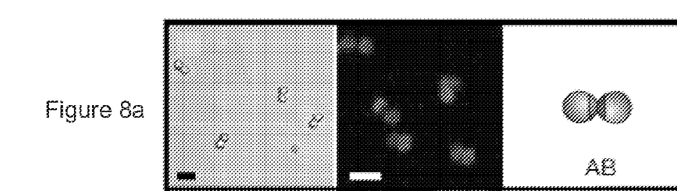

From monovalent (1-patch) particles with complementary sticky ends, AB type colloidal molecules can be constructed. In FIG. 8a (left), two monovalent particles stick together, forming colloidal dumbbells. In contrast to spherical particles uniformly coated with DNA, large aggregation does not occur, consistent with there being only one patch per particle. The confocal fluorescent image in FIG. 8a (middle) confirms that DNA hybridization is the driving force for assembly by showing that only complementary R-G particle pairs are formed; no R-R or G-G pairs are observed. Such pairs are the colloidal analog of AB type molecules such as hydrogen chloride (FIG. 8a, right). Here, in contrast to hydrogen and chlorine, the sizes of the two atoms are the same, although they need not be. Patchy particles of different sizes can be fabricated and DNA bonds of various strengths can be used, so colloidal molecules of different size ratio and bond strength can be obtained.

Example 8

Figure 8B:
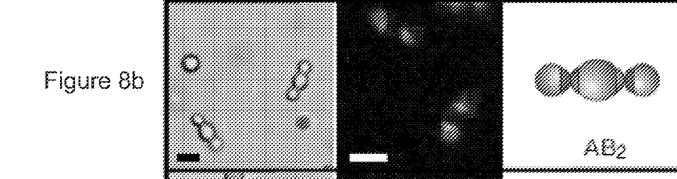
Figure 8C:
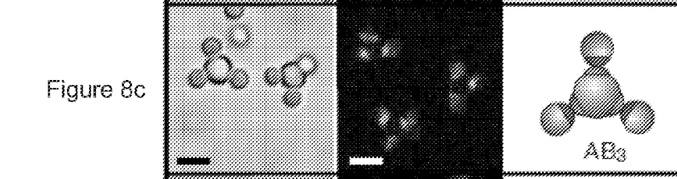
Figure 8D:
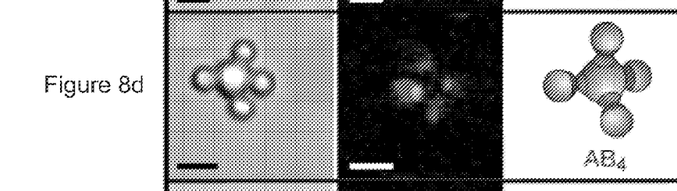

When G type divalent (2-patch) particles are mixed with R type monovalent particles, linear $AB_2$ type colloidal molecules are obtained, the colloidal analogues of molecules like carbon dioxide ($CO_2$), beryllium chloride ($BeCl_2$) and so on (FIG. 8b).

Example 9

Triangle-like $AB_3$ (FIG. 8c) and tetrahedron-like $AB_4$ (FIG. 8d) colloidal molecules can be obtained using trivalent (3-patch) particles and tetravalent (4-patch) particles when they are put together with monovalent particles in a similar manner. Molecular analogues of the $AB_3$ colloidal molecules include boron trifluoride ($BF_3$) while analogues of $AB_4$ molecules are methane ($CH_4$) and carbon tetrachloride ($CCl_4$).

Example 10

Figure 8E:
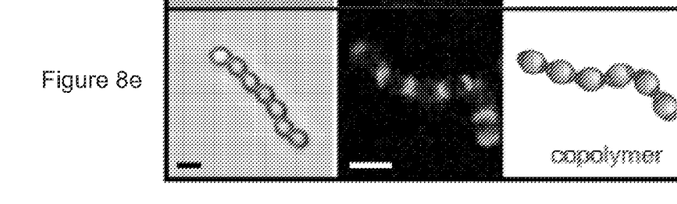
FIG. 8e shows mixing complementary divalent particles, linear alternating polymer chain spontaneously assembles.

Colloidal "alternating copolymer" chains can also be formed using complementary
colloidal divalent particles. FIG. 8e shows a chain consisting of divalent particles while the accompanying fluorescent image shows that only G and R type particles bind to each other.

Example 11

Figure 8F:
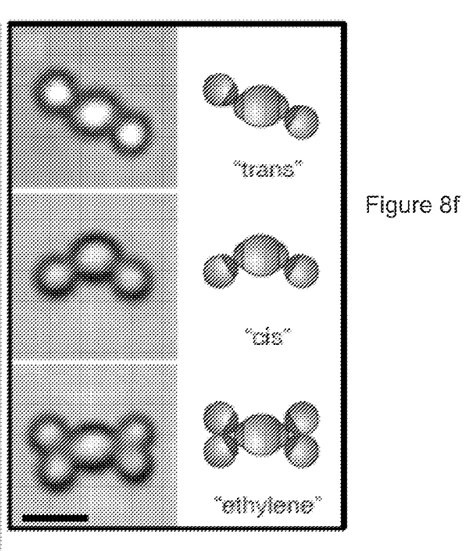

Particles with bigger patches can also be used to build colloidal molecules and polymers. If the patches are big enough to accommodate more than one complementary particle, molecular isomers and branched polymers are obtained. FIG. 8f shows that non-linear $AB_2$ type molecules are formed with conformational isomers that resemble the cis- and transconformation of a double bond. Such isomers may behave quite differently in diffusion, rotation and reactivity. If more monovalent particles are available, they can bind to the isomers and form an ethylene-like structure (see FIG. 8f). In the case of colloidal polymers of divalent particles, using particles with bigger patches leads to branched chains and crosslinked networks.

Example 12

Self-complementary palindrome strands can also be used for self-assembly of mono- and divalent particles. From monovalent particles, dumbbell $A_2$ type colloidal molecules can be constructed, such as $H_2$, $Cl_2$, etc. From divalent particles, homopolymers can be made. One can also envision trivalent, tetravalent, and palindrome particles of higher order that might assemble into extended open structures like a diamond lattice.

Example 13

Figure 10A:
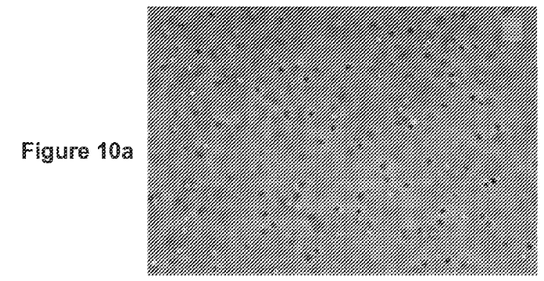
Figure 10B:
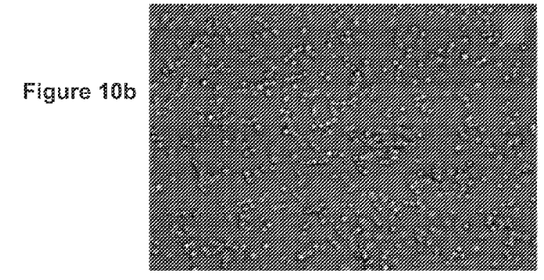
Figure 10C:
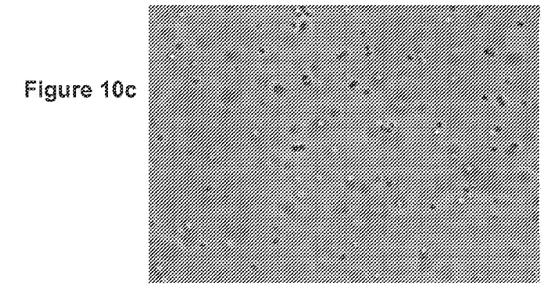
Figure 10D:
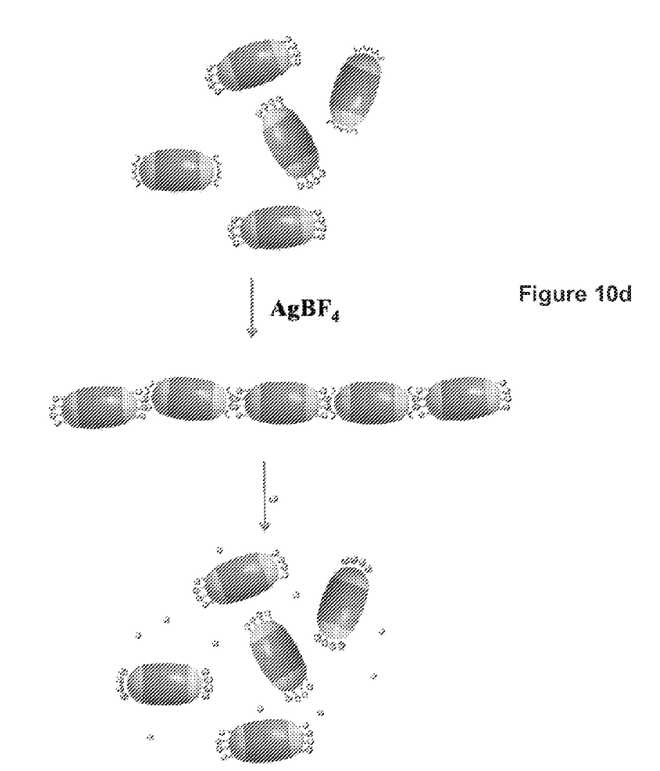

Pyridine and pincer polymer functionalized divalent particles (fabricated in Example 6) were combined in equal portions. No particles assembly was observed immediately following the sample mixing. The metal coordination was triggered by adding silver tetrafluoroborate ($AgBF_4$) to the particle suspension. Ag(I) can activate the palladated pincer by removing the Cl, leaving the palladium one open coordinating site (FIG. 6b). After the addition of $AgBF_4$, the particle mixture was then agitated for 5 hours at room temperature. Control experiments were also set up while a single type of dimer was mixed with $AgBF_4$ and particles mixtures without $AgBF_4$. After agitation, all samples were investigated in flat capillary tubes using inversed lens optical microscope. In the control set, the particles stayed stable and no aggregation is found. In sharp contrast, for the experimental set, most of the dimer particles aggregated and they formed daisy chains consisting of different number of particle within each chain. FIG. 10b is snapshots of particle chains with different length. The number of particle per chain varied from 2 to 12 and some branched structures are observed. More importantly, oval shape particles linked together in a head to head configuration, suggesting the existence of the attraction interactions only between the patchy parts.

The foregoing description of embodiments of the present invention has been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments, and with various modifications, as are suited to the particular use contemplated.

The invention claimed is:

1. A method for creating a colloidal particle of manufacture, comprising the steps of,
providing a plurality of functionalized colloidal particles;
assembling functionalized colloidal particles from the plurality of colloidal particles, forming a plurality of functionalized patchy particle having at least one patch comprising an exposed surface of a functionalized colloidal particle of the plurality of colloidal particles;
mixing the plurality of functionalized patchy particles, wherein the at least one patch enables selective bonding of a first of the plurality of functionalized patchy particles to a second of the plurality of functionalized patchy particles.

2. The method as defined in claim 1 further comprising selecting a valency for the plurality of functionalized patchy particles wherein the patch has a well-defined bond symmetry characteristic of atomic orbitals.

3. The method as defined in claim 2 wherein the atomic orbitals are selected from the group of s, p, sp, $sp^2$, $sp^3$, $sp^3d$, $sp^3d^2$ and $sp^3d^3$.

4. The method as defined in claim 1 wherein the step of providing a plurality of colloidal particles
comprises forming clusters of colloidal microspheres and performing an encapsulation method.

5. The method as defined in claim 4 wherein the clusters of colloidal microspheres include at least one of an amidinated surface functionality, a carboxylated surface functionality and a sulfonated surface functionality.

6. The method as defined in claim 4 wherein the clusters are encapsulated by swelling and polymerizing.

7. The method as defined in claim 4 wherein at least one colloidal particle includes a distinct patch which differs from the patch.

8. The method as defined in claim 7 wherein the distinct patch includes at least one of an amidinated surface functionality, a carboxylated surface functionality and a sulfonated surface functionality.

9. The method as defined in claim 4 further including a step of controlling morphology of the patchy particle.

10. The method as defined in claim 9 wherein the step of controlling the morphology includes a step of changing patch size by changing monomer amount added.

11. The method as defined in claim 1 wherein the step of functionalizing the patchy particle comprises forming at least one of a biotin, streptavidin and DNA conjugated patchy particle.

12. The method as defined in claim 11 wherein the step of functionalizing the patchy particle includes employing amidinated patchy particles and forming at least one of an amide bond, a biotin-streptavidin bond and a biotin-streptavidin-biotin bond.

13. The method as defined in claim 11 wherein the step of functionalizing the patchy particle includes a step of using an amidine-NHS coupling on a surface of the patchy particle.

14. The method as defined in claim 1 wherein the step of functionalizing the patchy particle comprises attaching synthetic molecules and polymers to a carboxylated surface functionalized one of the patchy particle.

15. The method as defined in claim 14 wherein the step of functionalizing the carboxylated patchy particle includes forming a covalent ester bond in conjunction with an organic solvent.

16. The method as defined in claim 14 wherein the step of functionalizing the carboxylated patchy particles a step of synthesizing the synthetic molecules and the polymers by a plurality of steps including an organic synthesis step and a living polymerization method step selected from the group of ROMP, ATRP, NMR and RAFT.

17. The method as defined in claim 16 wherein the step of synthesizing the synthetic molecules and the polymers having molecular structures includes incorporating into the synthetic molecules and the polymers having a molecular structure component capable of undergoing noncovalent attractions selected from the group of a palladated-pincer and a pyridine.

18. The method as defined in claim 14 wherein the step of functionalizing the carboxylated patchy particle comprising attaching streptavidin and DNA by forming a covalent amide bond in aqueous solution.

19. The method as defined in claim 15 wherein the step of attaching the synthetic molecules, and the synthetic polymers onto the patchy particle includes using EDC to make an activated ester coupling intermediate component in the organic solvent.

20. The method as defined in claim 18 wherein the step of attaching the synthetic molecules, the polymers, the streptavidin and the DNA onto the patchy particle includes using EDC to make an activated ester coupling intermediate component in the aqueous solvent.

21. The method as defined in claim 1 further including the step of self-assembly of the plurality of the functionalized patchy particles.

22. The method as defined in claim 21 wherein the step of self-assembly is accomplished by at least one a step of non-covalent interaction between the patches on different ones of the patchy particle.

23. The method as defined in claim 22 wherein the non-covalent interaction step includes forming hydrogen bonds and metal-coordination bonds.

24. The method as defined in claim 23 wherein the hydrogen bonds are formed by a step comprising using DNA hybridization between complementary and palindrome strands and forming of the metal coordination bonds comprise using palladated-pincer pyridine recognition units.

25. The method as defined in claim 21 wherein the step of self-assembly of the plurality of the patchy particle includes forming a bonding geometry selected from the group of s, p, sp, $sp^2$, $sp^a$, $sp^3d$, $sp^3d^2$ and $sp^3d^3$.

26. The method as defined in claim 21 wherein the patchy particle is constructed with a geometry characteristic of a chemical bond valence state.

27. The method as defined in claim 21 further including the step of monitoring kinetics of molecule formation.

28. The method as defined in claim 24 wherein the step of patchy particle bonding by DNA hybridization is selected from the group of specific bonding, programmable bonding and reversible bonding with temperature.

29. The method as defined in claim 24 wherein the step of patchy particle bonding by metal coordination includes designing the bonding for a selected strength.

30. The method as defined in claim 24 wherein the step of patchy particle bonding by metal coordination can be activated and deactivated by the step of providing selected small molecules.

31. An article of manufacture, comprising:
a plurality of functionalized patchy particles comprising N colloidal particles assembled into a cluster, wherein N is 1 to 7, with each of the plurality of functionalized patchy particles plurality of colloidal particles having surface patches; and
the patches functionalized to have at least one of recognition unit, thereby enabling bonding of surface patches of each of the plurality of functionalized patchy particles with surface patches of another of the plurality of functionalized patchy particles.

32. The article of manufacture as defined in claim 31 wherein the patch adopts a well-defined bond symmetry characteristic of a (hybridized) atomic orbital, including at least one orbital of a spherical linear, triangular, tetrahedral, trigonal bipyramidal, octahedral, pentagonal bipyramidal configuration.

33. The article of manufacture as defined in claim 31 wherein the patch comprises at least one of an amidinated surface functionality, a carboxylated surface functionality and a sulfonated surface functionality.

34. The article of manufacture as defined in claim 31 wherein the patch can be further functionalized using multiple coupling strategies including use of at least one of an EDC or NHS activated ester coupling methodology thereby yielding a covalent amide or ester bond.

35. The article of manufacture as defined in claim 31 wherein the patch can be further functionalized with a synthetic small molecule, a polymer, a bio-molecules and a macromolecule, including at least one of a biotin, streptavidin, oligonucleotides, and a norbornene based triblock copolymer.

36. The article of manufacture as defined in claim 31 wherein the bonding between a plurality of the particle patch has a valence characterization analogous to a chemical bond.

37. The article of manufacture as defined in claim 31 wherein the bonding between a plurality of the particle patch are realized by at least one of hydrogen bonding and metal coordination.

38. The article of manufacture as defined in claim 31 wherein the bonding between a plurality of the particle patch can be adjusted by external stimuli, selected from the group of temperature and use of a small guest molecule.

39. The article of manufacture as defined in claim 31 wherein the patch is selected from the group of a plurality of different patches and different symmetry, thereby enabling formation of clusters of the plurality of colloidal particles having controlled symmetry.

\* \* \* \* \*

UNITED STATES PATENT AND TRADEMARK OFFICE
CERTIFICATE OF CORRECTION

| | | |
|---|---|---|
| PATENT NO. | : 9,486,768 B2 | Page 1 of 1 |
| APPLICATION NO. | : 14/438862 | |
| DATED | : November 8, 2016 | |
| INVENTOR(S) | : Pine et al. | |

It is certified that error appears in the above-identified patent and that said Letters Patent is hereby corrected as shown below:

On the Title Page

(72) Inventors, please insert:
-- David J. Pine New York, NY (US), Yufeng Wang New York, NY (US), Yu Wang New York, NY (US), Marcus Weck New York, NY (US), Dana R. Breed Gray, Tennessee (US), and Vinothan N. Manoharan Cambridge, MA --

Signed and Sealed this
Third Day of September, 2019

Andrei Iancu
*Director of the United States Patent and Trademark Office*

UNITED STATES PATENT AND TRADEMARK OFFICE
CERTIFICATE OF CORRECTION

PATENT NO. : 9,486,768 B2
APPLICATION NO. : 14/438862
DATED : November 8, 2016
INVENTOR(S) : David J. Pine et al.

Page 1 of 1

It is certified that error appears in the above-identified patent and that said Letters Patent is hereby corrected as shown below:

In the Specification

In Column 1, Lines 16-19, please delete "This work was supported by the MRSEC Program of the National Science Foundation under Award Number DMR-0820341 and also by the National Science Foundation Grant ChE-0911460." and insert --This invention was made with government support under CHE0911460 and DMR0820341 awarded by the National Science Foundation. The government has certain rights in the invention.--

Signed and Sealed this
Fifteenth Day of April, 2025

Coke Morgan Stewart
*Acting Director of the United States Patent and Trademark Office*